Patented June 25, 1929.

1,718,284

UNITED STATES PATENT OFFICE.

ANTHONY GEORGE AND MAURICE C. TAYLOR, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF CALCIUM HYPOCHLORITE.

No Drawing. Application filed August 4, 1926. Serial No. 127,169.

This invention relates to improvements in the production of calcium hypochlorite products. The product of this invention comprises calcium hypochlorite associated with some sodium chloride. Calcium hypochlorite, that is $Ca(OCl)_2$ in pure form is relatively stable but calcium chloride if present in substantial amount makes it relatively unstable. This is apparently due to the hygroscopic properties of calcium chloride. Sodium chloride, on the contrary, does not decrease the stability of calcium hypochlorite. This invention provides an improved method of making calcium hypochlorite products of high purity, particularly with reference to contamination with calcium chloride, and which has several further important advantages.

According to the present invention, lime is chlorinated in the presence of caustic soda or sodium hypochlorite in a slurry made up of the lime, the caustic soda or the sodium hypochlorite, and a solution saturated with respect to both sodium chloride and calcium hypochlorite. Such solutions saturated with respect to both sodium chloride, or alkali metal chlorides, and calcium hypochlorite will hereinafter be designated as "eutectic" solutions of these compounds. The invention may be carried out in a variety of ways with the production of various products differing among themselves but all comprising calcium hypochlorite associated with some sodium chloride and substantially free from calcium chloride, or nearly so.

In one way of carrying out the invention, lime and caustic soda are subjected to chlorination in an eutectic solution of sodium chloride and calcium hypochlorite. Such an eutectic solution may be prepared, for example, by adding salt and calcium hypochorite to water until no more of either will dissolve. After the addition of sodium hydroxide and lime, for example in the ratio of two moles of the former to one mole of the latter, the mixture is chlorinated, advantageously until not more than about 1% of free alkali remains. Crystallization of the calcium hypochlorite product may be promoted, for example, by agitation, and the product separated, for example, by filtration, when crystallization is complete. The filtrate from which the product has been separated may be employed as a medium in which successive chlorinations are carried out.

This mode of carrying out the invention is illustrated by the following example: 4.7 lbs. of caustic soda and 4.6 lbs. of high grade lime (95% $Ca(OH)_2$) are added to 100 lbs. of an eutectic solution containing approximately 19.6 lbs. of sodium chloride, 9.6 lbs. of calcium hypochlorite and 70.8 lbs. of water. This mixture is chlorinated until less than 1% of free alkali remains in solution, about 8.2 lbs. of chlorine being required. Following chlorination, the slurry is stirred for about 1 hr., and the precipitate may then be separated in any convenient or desired manner. The precipitated product, may for example, be filtered, or filtered and pressed, or subjected to a combined filtering and pressing operation. The amount of mother liquor remaining in the separated product depends upon the manner in which the precipitate is separated and treated. By filtration without pressing, a product comprising approximately 48% of calcium hypochlorite, 2% or less of calcium chloride, 45% of sodium chloride and 5% of lime may be obtained. The product can be dried, for example, in an atmospheric or a vacuum drier at temperatures between 40° and 60° C. After the addition of further quantities of caustic soda and lime, the solution from which the product is separated may be returned to the chlorination operation. For the maintenance of constant conditions, it is necessary where the separated solution is so returned to replace water removed with the separated hypochlorite product. It is advantageous to maintain a temperature in the neighborhood of 15° to 30° C. when chlorination is begun and to reduce this to approximately 10° to 15° C. as the chlorination operation is concluded.

In another way of carrying out the invention, the foregoing procedure may be somewhat modified to effect a reduction in the amount of sodium chloride present in the product. When caustic soda and lime are chlorinated in an eutectic solution as described above, the sodium chloride formed precipitates practically at once whereas the calcium hypochlorite tends to remain in solution in an unstable condition. According to the present invention, a part of the salt which settles readily may thus be separated from the hypochlorite product by removing salt precipitated before precipitation of calcium hypochlorite begins. Immediate precipitation of calcium hypochlorite from aqueous eutectic solutions containing the reaction products of lime, caustic soda and chlorine, or lime, sodium hypochlorite and chlorine, does not begin until the concentration of calcium hypochlorite and sodium chloride exceeds a value approximating 14.6% and 18.7% respectively although in a stable condition calcium hypochlorite in excess of about 9.6% will precipitate. Following separation of sodium chloride precipitated before the precipitation of calcium hypochlorite begins, the crystallization and precipitation of calcium hypochlorite may be promoted, for example by seeding with crystals of calcium hypochlorite or by an agitation.

This mode of carrying out the invention is illustrated by the following example: 3.4 lbs. of lime (95% $Ca(OH)_2$) and 3.49 lbs. of caustic soda are added to 100 lbs. of an eutectic solution containing about 19.6 lbs. of sodium chloride and 9.6 lbs. of calcium hypochlorite and this mixture is chlorinated until not more than about 1% of free alkali remains. The slurry remains thin and in a condition in which chlorination is easily effected without violent agitation substantially to completion. Following chlorination, salt is allowed to settle for about 10 minutes and the comparatively clear solution then decanted. Crystallization of the hypochlorite product from the decanted solution is then promoted, for example, by stirring or by seeding or by both. The thick slurry resulting from the crystallization operation may be filtered for the separation of the hypochlorite product and the filtrate so obtained employed as the medium for successive chlorination. The precipitated and separated product may be dried either before or after pressing, and then consists essentially of calcium hypochlorite contaminated only with that salt present in mother liquor remaining on the filter or press cake.

In another way of carrying out the invention, sodium hypochlorite and lime are together subjected to chlorination in an eutectic solution of sodium chloride and calcium hypochlorite. Instead of employing sodium hypochlorite, a solution of salt and sodium hypochlorite may be prepared by chlorination of a solution of caustic soda and this solution may be used as a source of sodium hypochlorite making due allowance for the salt which it contains. Such a sodium hypochlorite solution, or sodium hypochlorite, and lime may be added to an eutectic solution of salt and calcium hypochlorite and the mixture is chlorinated in much the same manner that caustic soda and lime are subjected to chlorination in such an eutectic solution in the modification of the invention first described. The hypochlorite product, however, will contain less salt.

This mode of carrying out the invention will be illustrated by the following example: 55 lbs. of caustic soda are dissolved in 65.3 lbs. of water, and this solution is chlorinated until not more than about 6% of free caustic soda remains. Precipitated salt may be separated, for example, by settling and decantation. Any sodium hypochlorite remaining in such separated salt may be recovered by washing the salt with water and using the wash water as the medium in which a successive chlorination of caustic soda is carried out. The sodium hypochlorite solution may, for example, comprise about 29.0% of sodium hypochlorite, 7.5% of sodium chloride, 1.5% of sodium hydroxide and 62.0% of water. 100 lbs. of this sodium hypochlorite solution and 33 lbs. of lime (95% $Ca(OH)_2$) are added to an amount of an eutectic solution of salt and calcium hypochlorite such that the slurry resulting from chlorination is conveniently handled, and the mixture is chlorinated until less than about 1% of free alkali remains, about 32.6 lbs. of chlorine being required. The precipitated hypochlorite product may be separated in any convenient manner, such as those described above. The product may, for example, be filtered and not pressed, or it may be filtered and pressed, the pressing advantageously being carried to a point only sufficient to maintain the quality of product desired to avoid accumulation of the eutectic solution.

Following the chlorination of sodium hypochlorite and lime in an eutectic solution of salt and calcium hypochlorite, salt may be separated before the precipitation of calcium hypochlorite begins in the manner described in connection with the second foregoing modification of the invention.

One of the advantages of the invention is that it is particularly adapted to being carried as a continuous operation. In continuous operation of the modification of the invention first described, for example, the eutectic solution of salt and calcium hypochlorite may be circulated continuously through a receptacle into which lime, caustic soda and chlorine are continuously introduced in appropriate proportions, and the liquor containing the reaction products circulated to and through a precipitation and settling tank or tower, from the top of which overflowing liquor may be returned to the receptacle in which chlorination is carried out and from the bottom of which the calcium hypochlorite product may be removed, and, for example, passed to a continuous filter or the like. Any other filtrates derived from the treatment of the separated hypochlorite product may also be returned in a continuous manner to the receptacle in which the chlorination is effected. If the precipitated hypochlorite product is to be separated by settling or some similar operation, it is advantageous to maintain the concentration of solids relatively low, for example less than about 10%, but the entire circulating stream of eutectic solution can be subjected to continuous filtration and the amount of the eutectic solution necessary to be maintained in circulation thus decreased by carrying the concentration of solids to a higher value. It is also necessary, in such continuous operation, to add water sufficient to maintain a constant volume of circulating eutectic solution. The second modification of the invention described above may also be carried out in a continuous manner by adding the operation of salt removal, for example by decantation, to the cycle just described. The third and fourth modifications of the invention described above may also be carried out continuously in a manner similar to that described in connection with the first and second modifications of the invention.

While the invention has been described with particular reference to the use of sodium hydroxide, sodium hypochlorite and sodium chloride, similar compounds of other alkali metals are also useful in carrying out the invention. When used, the product will then comprise calcium hypochlorite associated with the chloride of such other alkali metal. The alkali metal compounds useful in connection with the chlorination of lime in carrying out the invention include those which in the presence of lime and chlorine react to form calcium hypochlorite and the alkali metal chloride.

We claim:

1. An improved method of making a hypochlorite product which comprises chlorinating a slurry containing lime and an alkali metal compound, reacting to form calcium hypochlorite and an alkali metal chloride in the presence of lime and chlorine, in an eutectic solution of calcium hypochlorite and the chloride of the alkali metal.

2. An improved method of making a hypochlorite product which comprises chlorinating a slurry containing lime and a sodium compound, reacting to form calcium hypochlorite and sodium chloride in the presence of lime and chlorine, in an eutectic solution of calcium hypochlorite and sodium chloride.

3. An improved method of making a hypochlorite product which comprises chlorinating a slurry containing lime and sodium hypochlorite in an eutectic solution of calcium hypochlorite and sodium chloride.

4. An improved method of making a hypochlorite product which comprises chlorinating a slurry containing lime and a solution of sodium hypochlorite in an eutectic solution of calcium hypochlorite and sodium chloride.

5. An improved method of making a hypochlorite product which comprises chlorinating a slurry containing lime and a solution of sodium hypochlorite and sodium chloride in an eutectic solution of calcium hypochlorite and sodium chloride.

6. An improved method of making a hypochlorite product which comprises chlorinating a solution of caustic soda, adding this chlorinated solution together with lime to an eutectic solution of calcium hypochlorite and sodium chloride, and chlorinating the resulting mixture.

7. An improved method of making a hypochlorite product which comprises chlorinating a slurry containing lime and a sodium compound, reacting to form calcium hypochlorite and sodium chloride in the presence of lime and chlorine, in an eutectic solution of calcium hypochlorite and sodium chloride, and separating precipitated sodium chloride before calcium hypochlorite begins to precipitate.

8. An improved method of making a hypochlorite product which comprises bringing an eutectic solution of sodium chloride and calcium hypochlorite to supersaturation with calcium hypochlorite while permitting sodium chloride to precipitate by chlorinating lime and a sodium compound reacting to form calcium hypochlorite and sodium chloride in the presence of lime and chlorine therein, separating precipitated sodium chloride and thereafter effecting precipitation of calcium hypochlorite.

In testimony whereof we affix our signatures.

ANTHONY GEORGE.
MAURICE C. TAYLOR.